United States Patent
Perahia et al.

(10) Patent No.: US 10,033,794 B2
(45) Date of Patent: Jul. 24, 2018

(54) NETWORK TRANSFER OF LARGE FILES IN UNSTABLE NETWORK ENVIRONMENTS

(71) Applicant: Bio-Rad Laboratories, Inc., Hercules, CA (US)

(72) Inventors: Oron Perahia, Holon (IL); Arkadi Brover, Rishon LeZion (IL)

(73) Assignee: Bio-Rad Laboratories, Inc., Hercules, CA (US)

( * ) Notice: Subject to any disclaimer, the term of this patent is extended or adjusted under 35 U.S.C. 154(b) by 162 days.

(21) Appl. No.: 15/206,905

(22) Filed: Jul. 11, 2016

(65) Prior Publication Data

US 2017/0019458 A1    Jan. 19, 2017

Related U.S. Application Data

(60) Provisional application No. 62/194,104, filed on Jul. 17, 2015.

(51) Int. Cl.
*G06F 15/16* (2006.01)
*H04L 29/08* (2006.01)
*H04W 76/19* (2018.01)
*H04L 29/14* (2006.01)
*H04L 29/06* (2006.01)

(52) U.S. Cl.
CPC ............. *H04L 67/06* (2013.01); *H04L 69/22* (2013.01); *H04L 69/40* (2013.01); *H04W 76/19* (2018.02); *H04L 67/02* (2013.01); *H04L 67/42* (2013.01)

(58) Field of Classification Search
CPC ......... H04L 67/06; H04L 69/22; H04L 69/40; H04L 67/02; H04L 67/42; H04W 76/19; H04W 76/028

USPC ........................................................ 709/219
See application file for complete search history.

(56) References Cited

U.S. PATENT DOCUMENTS

| 8,379,851 | B2 | 2/2013 | Mehrotra et al. |
| 8,909,261 | B1 | 12/2014 | Upadhyay et al. |
| 9,769,235 | B2* | 9/2017 | Schmidt ................ H04L 65/607 |
| 9,807,138 | B2* | 10/2017 | Galligan ............... H04L 65/601 |
| 9,813,740 | B2* | 11/2017 | Panje ............. H04N 21/234363 |
| 9,838,450 | B2* | 12/2017 | McGowan .............. H04L 65/60 |

(Continued)

FOREIGN PATENT DOCUMENTS

| EP | 1026866 A1 | 8/2000 |
| WO | 2012005609 A1 | 1/2012 |

OTHER PUBLICATIONS

Communication pursuant to Article 94(3) EPC dated Nov. 22, 2017 in EP Patent Application No. 16179409.4. 8 pages.

(Continued)

*Primary Examiner* — Melvin H Pollack
(74) *Attorney, Agent, or Firm* — Kilpatrick Townsend & Stockton LLP

(57) ABSTRACT

A file with a unique filename is transferred from a client computer to a server computer in chunks, which can be packaged into packets including metadata. The server computer can record indices of received chunks in a local metadata file associated with the file. Upon receiving the filename in a subsequent client request after a connection loss, the server computer can use the associated metadata file to determine whether portions of the file are missing. If so, the server computer can send indices corresponding to missing ranges instead of the client computer resending the whole file.

24 Claims, 9 Drawing Sheets

(56) References Cited

U.S. PATENT DOCUMENTS

| | | | | |
|---|---|---|---|---|
| 9,866,605 | B2* | 1/2018 | Begen | H04L 65/60 |
| 2005/0209927 | A1 | 9/2005 | Aaltonen et al. | |
| 2017/0134463 | A1* | 5/2017 | Kim | H04L 65/601 |
| 2017/0251246 | A1* | 8/2017 | Hua | H04N 21/44004 |
| 2017/0374127 | A1* | 12/2017 | Hosur | H04L 65/608 |
| 2018/0007421 | A1* | 1/2018 | Yoo | H04N 21/4345 |

OTHER PUBLICATIONS

Fielding et al., "Hypertext Transfer Protocol—HTTP/1.1; rfc2616.txt", Internet X.509 Public Key Infrastructure Certificate and Certificate Revocation List (CRL) Profile; RFC5280.TXT, Internet Society (ISOC) 4, Jun. 30, 1999, 178 pages.

Fielding et al., "Hypertext Transfer Protocol (HTTP/1.1): Range Requests; rfc7233.txt", Hypertext Transfer Protocol (HTTP/1.1): Range Requests; RFC7233.TXT, Internet Engineering Task Force, IETF; Standard, Internet Society (ISOC) 4, Jun. 7, 2014, pp. 1-25.

EP16179409.4, "Extended European Search Report", dated Dec. 21, 2016, 17 pages.

Monchamp, Ted D., "Adaptive Bit-Rate Streaming Minimizing End-User Buffer Time in Real-Time Video Delivery," InSight: Rivier Academic Journal, (Fall 2013), 9(2):1-12.

"Adaptive bitrate streaming" Wikipedia, https://en.wikipedia.org/wiki/Adaptive_bitrate_streaming, Sep. 27, 2016, pp. 1-4.

* cited by examiner

NETWORK TRANSFER OF LARGE FILES IN UNSTABLE NETWORK ENVIRONMENTS

CROSS-REFERENCES TO RELATED APPLICATIONS

This application claims the benefit of U.S. Provisional Application No. 62/194,104, filed Jul. 17, 2015, the disclosure of which is hereby incorporated by reference in its entirety for all purposes.

BACKGROUND

Transferring large files between computers can cause various issues. For example, interrupted communication can disrupt a file transfer and may result in loss of progress. This may require a restart of a file transfer and resending of files that have previously been sent. This can be an inefficient use of resources and time.

Embodiments of the invention address this and other problems, individually and collectively.

BRIEF SUMMARY

Embodiments of the present invention relate to methods, systems, and apparatuses that enable file transfer for large files (e.g., broken into packets) in networks that may be unstable (e.g., connections can be lost). The transmission of a file may be performed using HTTP.

According to one embodiment of the invention, a server computer can receive, from a client computer, a first request to establish a first HTTP connection. The server computer can receive metadata for a file over the first HTTP connection as part of the first request. The metadata can include at least a filename, a client ID, and a file size.

After determining that at least a portion of the file is not stored at the server computer based on the received filename, the server computer can send to the client computer, over the first HTTP connection, an indication of the at least a portion of the file to be sent by the client computer to the server computer. The server computer can then send, over the first HTTP connection, a suggested chunk size to be utilized by the client computer when sending the at least a portion of the file to the server computer. Subsequently, the server computer can receive, over the first HTTP connection, one or more chunks of the file from the client computer. Each chunk can be a size less than or equal to the chunk size and each chunk can specify a start index and an end index for the chunk. The server computer can store information indicating parts of the file that have been received.

In some cases, the first HTTP connection between the server computer and the client computer can be lost. In response, the server computer can receive a second request to establish a second HTTP connection from the client computer. The server computer can receive, over the second HTTP connection, the metadata for the file as part of the second request. The server computer can determine that the file has not been completely received and can send a missing start index and a missing end index corresponding to a missing part of the file to the client computer. The server computer can then receive the missing part of the file from the client computer and send a confirmation that the file has been stored completely to the client computer.

Embodiments of the invention are further directed to a computer comprising a processor and a memory element. The memory element can comprise code, executable by the processor, for implementing any of the methods described herein.

These and other embodiments of the invention are described in further detail below.

DETAILED DESCRIPTION

Embodiments of the invention provide a protocol to transfer files between a client computer and a server computer. Data can be sent between the computers by HTTP connection. The server computer can receive first request to establish a first HTTP connection from the client computer. The server computer may receive metadata, including at least a filename, a client ID, and a file size, for a file as part of the first request. The metadata can be utilized to enable a file to be transferred from the client computer to the server computer. The server computer may determine that at least a portion of the file is not stored at the server computer based on the filename. In various embodiments, the client computer may send the file to the server computer in chunks, where the size of a chunk may be less than or equal to a chunk size suggested by the server computer. The server computer may store information indicating parts of the file that have been received in a metadata file stored at the server computer.

In some cases, the connection between the server computer and the client computer may be lost. However, the server computer may have stored necessary information to continue the file transfer for the file. The client computer may send a second request to establish a second HTTP connection between the client computer and the server computer. The server computer may receive the metadata for the file as part of the second request. After the second HTTP connection is established with the client computer, the server computer may determine a part of the file that was not received based on information in the metadata file and may send the client computer a missing start index and a missing end index corresponding to the missing part of the file. The server computer may receive the missing part of the file from the client computer. After storing the entire file, the server computer may send a confirmation that the file has been stored completely to the client computer.

I. System

An exemplary system including a client computer and server computer for enabling a file transfer protocol is described.

A. Example Architecture

Figure 1:
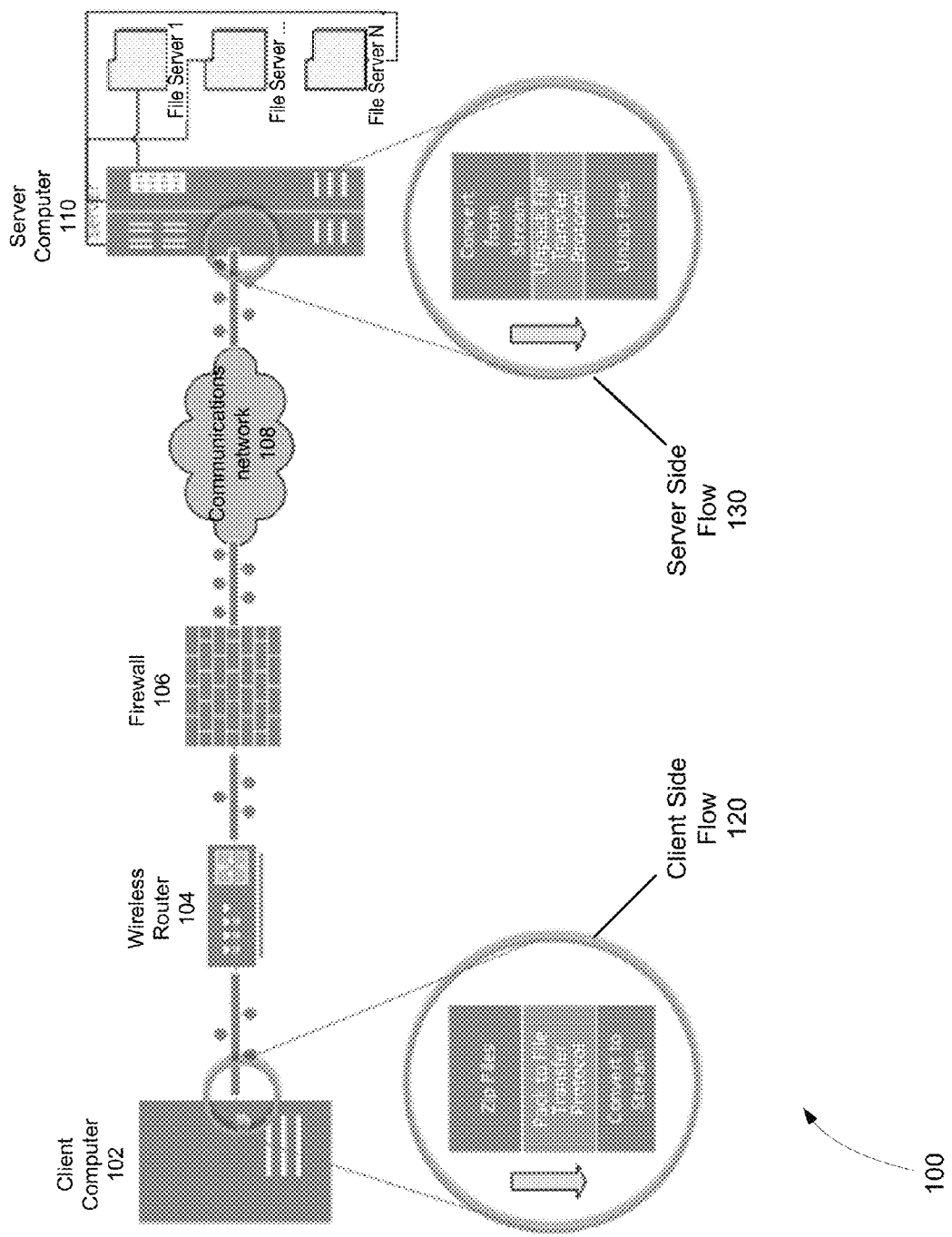
FIG. 1 shows an exemplary system according to embodiments of the present invention.

FIG. 1 shows an exemplary system 100 according to embodiments of the present invention. FIG. 1 includes a client computer 102, a wireless router 104, a firewall 106, a communications network 108, and a server computer 110. FIG. 1 also shows a high level description of a client side flow 120 and a server side flow 130.

Client computer 102 may communicate messages to server computer 110. The messages may be of any suitable form. For example, client computer 102 may send a request message that may use TCP/IP packets, HTTP, or in any other suitable formats and combinations thereof. Client computer 102 may include any hardware, software, other logic, or combination of the preceding for communicating with server computer 110. Client computer 102 may comprise one or more computational apparatuses and may use any of a variety of computing structures, arrangements, and compilations. In some cases, client computer 102 may be running an installed program (e.g., an application). A computer may comprise a system with a plurality of individual computing devices.

Wireless router 104 can enable wireless communications between one or more devices. Wireless router 104 may be capable of forwarding data between computer networks, such as communications network 108, and may enable wireless communications between client computer 102 and server computer 110. In some embodiments, wireless router 104 may not have network address translation capability.

Firewall 106 may regulate communication between multiple entities. For example, firewall 106 may prevent unrestricted access to or from an entity. In some cases, firewall 106 may prevent two-way communication between client computer 102 and server computer 110.

Accordingly, embodiments of the invention may enable a file transfer protocol that may be conducted even with the presence of firewall 106 between client computer 102 and server computer 110 and without network address translation capability from wireless router 104. This is possible since the file transfer can be compatible with one-way communication, where client computer 102 sends requests (e.g., HTTP POST requests) to server computer 110 and server computer 110 may respond to the received requests, but may not initiate communication with client computer 102.

Communications network 108 may comprise a plurality of networks for secure communication of data and information between entities. In some embodiments, communications network 108 may follow a suitable communication protocol to generate one or more secure communication channels. Any suitable communications protocol may be used for generating a communications channel. A communication channel may in some instance comprise a "secure communication channel," which may be established in any known manner, including the use of mutual authentication and a session key and establishment of an SSL session. However, any method of creating a secure channel may be used.

Server computer 110 may communicate with client computer 102 to store file data to server computer 110. Server computer 110 can be a large mainframe, a minicomputer cluster, or a group of servers functioning as a unit. In one example, server computer 110 may be coupled to one or more file servers. Server computer 110 may include any hardware, software, other logic, or combination of the preceding for servicing the requests from one or more client computers, such as client computer 102. Server computer 110 may comprise one or more computational apparatuses and may use any of a variety of computing structures, arrangements, and compilations. In an embodiment, server computer 110 may not directly connect with client computer 102 if there is a one-way communication in which client computer 102 sends requests to server computer 110.

Client side flow 120 shows a high level flow of actions that can be conducted by client computer 102. Client side flow 120 may include zipping files to transfer, packing data into packets according to the file transfer protocol, and converting package data to a file stream before transferring the files to server computer 110. In some embodiments, there may be multiple client computers conducting functionality of client computer 102. One embodiment of client side flow 120 is described in exemplary client side flow diagram 700 of FIG. 7

Server side flow 130 shows a high level flow of actions that can be conducted by server computer 110. Server side flow 130 may include converting a file stream received from client computer 102 to package data, unpacking packets according to the file transfer protocol, and unzipping files that have been transferred. In some embodiments, there may be multiple server computers conducting functionality of server computer 110. One embodiment of server side flow 130 is described in exemplary server side flow diagram 800 of FIG. 8.

In an exemplary use case, client computer 102 may transfer files to server computer 110 to monitor laboratory instrument systems. For example, laboratory instruments may be connected to client computer 102, which can activate the instruments, collect periodical logs recorded by the instruments, and send the logs to server computer 110 according to the file transfer protocol. A user may utilize server computer 110 to deploy information in a user interface (e.g., of a website), review the logs, and retrieve additional information about the instruments. Server computer 110 may have mechanisms that parse the logs and provide analysis (e.g., error notification for support users, statistical reports of data from instruments, etc.). However, the systems, methods, and apparatuses described herein may be utilized for any suitable data transfer.

B. File Transfer Protocol Library

Figure 2:
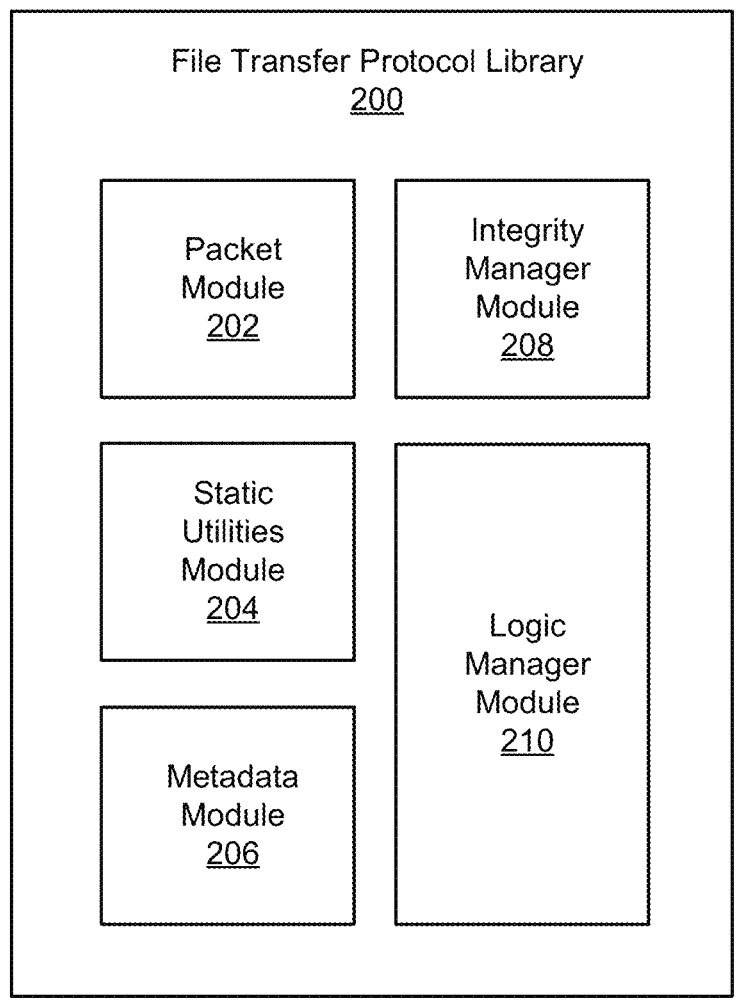
FIG. 2 shows an exemplary block diagram of a file transfer protocol library according to embodiments of the present invention.

FIG. 2 shows an exemplary block diagram of a file transfer protocol library 200 according to embodiments of the present invention. FIG. 2 includes a packet module 202, a static utilities module 204, a metadata module 206, an integrity manager module 208, and a logic manager module 210.

File transfer protocol library 200 may manage processing of a file during a transmission. For example, file transfer protocol library 200 may enable a file to be sent in chunks that may be packed into packets, which can contain a portion (chunk) of file content, file information, chunk information, and other metadata. A chunk may correspond to the content of a portion of a file.

According to embodiments of the invention, a packet may hold any suitable data relevant to transferring a file chunk. Packets may act as the file building blocks over a network and may be utilized to send any information between a client computer and a server computer. In various embodiments, a packet may include the following properties:

Chunk size—The size (e.g., number of bytes) of pure file data of a chunk

Chunk content—Pure file data (e.g., raw data) of the chunk to transfer

File Path—The source location of the file

File Name—The full unique file name of the file

File Full Destination—The destination on the file server to save the file (e.g., to support multiple file server scalability)

Range Indices—Start index, the index which the chunk content starts inside the file, and end index, the index which the chunk content ends inside the file File Size—The real full file size Last Chunk—Boolean that indicates whether the current chunk is the last chunk in the file stream Enum: {Request/Response}—Represent if the packet is a response or a request Packet module 202 may contain any information relevant to packets according to embodiments of the invention. For example, packet module 202 may hold raw data of the chunks of the file, as well as indices (e.g., start index and end index) associated with the chunks.

Static utilities module 204 may contain information related to processing packets. This information may include utilities that allow binary serialization and deserialization, as well as reading and writing files to a local file system. The information may also include utilities that enable dividing, slicing, and converting raw data into packets, and further converting and combining the packets into an incoming file.

Metadata module 206 may hold any information related to a file. Metadata module 206 may contain metadata including a filename, a client ID, and a file size. Metadata module 206 may also hold integrity information of the metadata, as well as manage index ranges of missing parts of the file being transferred.

Integrity manager module 208 may hold information enabling verification of the validity of a file's data. The information may include functions and objects that verify the integrity of the data received. For example, integrity manager module 208 may determine that the file size of a file has been changed and may trigger a reset of metadata associated with the file. In some cases, this may indicate that the file be overwritten during a file transfer.

Logic manager module 210 may manage the work flow of file transfer protocol library 200. For example, logic manager module 210 may manage incoming and outgoing packets and may determine the appropriate modules to utilize at a certain time. Logic manager module 210 may be the first and the last module to run until the completion of the file transmission.

C. Client Transmitter Module

Figure 3:
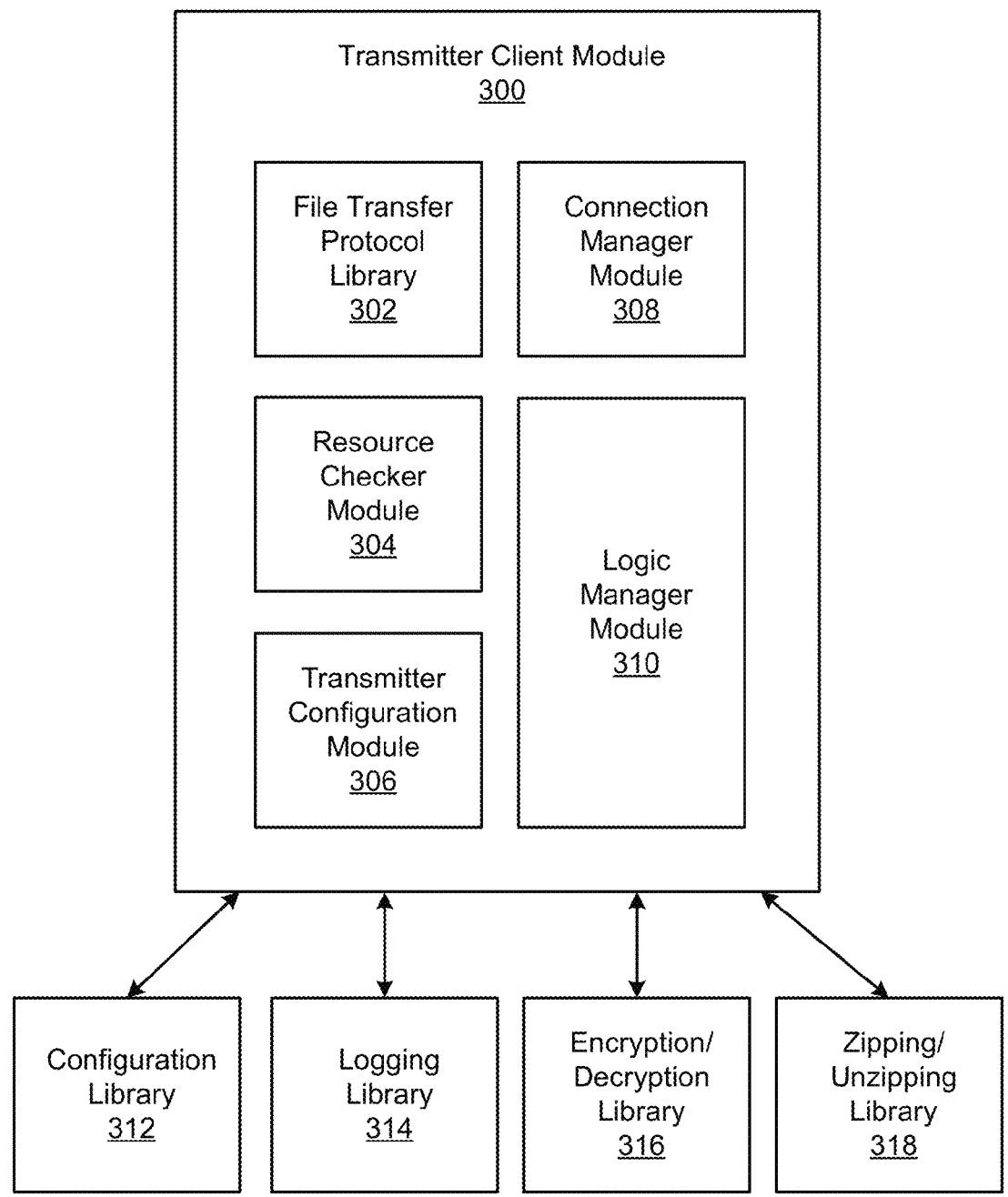
FIG. 3 shows an exemplary block diagram of a transmitter client module according to embodiments of the present invention.

FIG. 3 shows an exemplary block diagram of a transmitter client module 300 according to embodiments of the present invention. Transmitter client module 300 may run on a client computer, such as client computer 102 of FIG. 1, and may enable the client computer to transfer a file to server computer 110. In some embodiments, transmitter client module 300 may be in communication with a console application and a user interface application that can run on the client computer.

FIG. 3 includes file transfer protocol library 302, a resource checker module 304, a transmitter configuration module 306, a connection manager module 308, and a logic manager module 310. Transmitter client module 300 may be in communication with one or more libraries, such as configuration library 312, logging library 314, encryption/decryption library 316, and zipping/unzipping library 318.

File transfer protocol library 302 may manage processing (e.g., chunking and packaging) of a file during the transmission. File transfer protocol library 302 may have similar features to those of file transfer protocol library 200 described in FIG. 2.

Resource checker module 304 may detect conflicting processes during a file transfer. Conflicting processes may include processes that may be attempting to utilize a same resource as the client. Resource checker module 304 may lock the resource while in use in order to not let other processes simultaneously utilize it. For example, resource checker module 304 may lock a file in a middle of a process during transfer to prevent other processes from utilizing the same file.

Transmitter configuration module 306 may contain any configuration information related to the transmitter client. In some cases, configuration data may include a suffix for metadata files and a maximum chunk size. The maximum chunk size may be a default value that can be utilized in a case in which a network component may not return a valid input. In some cases, the maximum chunk size value may be utilized for flow control or as an input to an algorithm calculating a suggested or appropriate chunk size. Configuration information may also include security settings (e.g., username, password, authentication information, etc.), log setting (e.g., log filenames, log file sizes, etc.), directory settings, (e.g., directory names, file paths, folder sizes, etc.), transfer settings (e.g., timeout lengths, maximum number of retries before fail, port values, host information, etc.), proxy settings (etc., proxy values, connection options, etc.), and other general settings (e.g., sleep time for conflicting processes, etc.)

Connection manager module 308 may manage communications (e.g., outgoing and incoming network calls, proxies, etc.). Connection manager module 308 may also manage connection stability. For example, if a request has been timed out, connection manager module 308 may notify logic manager module 310 to reduce the maximum chunk size for the file transfer (e.g., reduce to half of last chunk size). On each successive packet transmitted, if connection is stable, connection manager module 308 may notify logic manager module 310 to increase the maximum chunk size (e.g., increase the last chunk size by 1).

Logic manager module 310 may manage the work flow of transmitter client module 300. An exemplary flow enabled by logic manager module 310 may include loading configuration information from a file, getting permission to run from resource checker module 304, zipping files and moving them to an appropriate folder, calling file transfer protocol library 302 to generate packets, and calling connection manager module 308 to send the files, receive a response, and delete the files that have been fully transferred.

Transmitter client module 300 may be in communication with one or more libraries. Configuration library 312 may include modules that enable saving and loading configurations to files (e.g., XML). Logging library 314 may include modules that enable logging of critical events and traces (e.g., errors, timeouts, etc.). Encryption/decryption library 316 may include modules that enable encryption and decryption of XML or other data (e.g., chunks, metadata, etc.). Zipping/unzipping library 318 may include modules that enable compressing and decompressing of files. In some embodiments, zipping/unzipping library 318 may provide multi-threaded capabilities.

D. Server Transmitter Module

Figure 4:
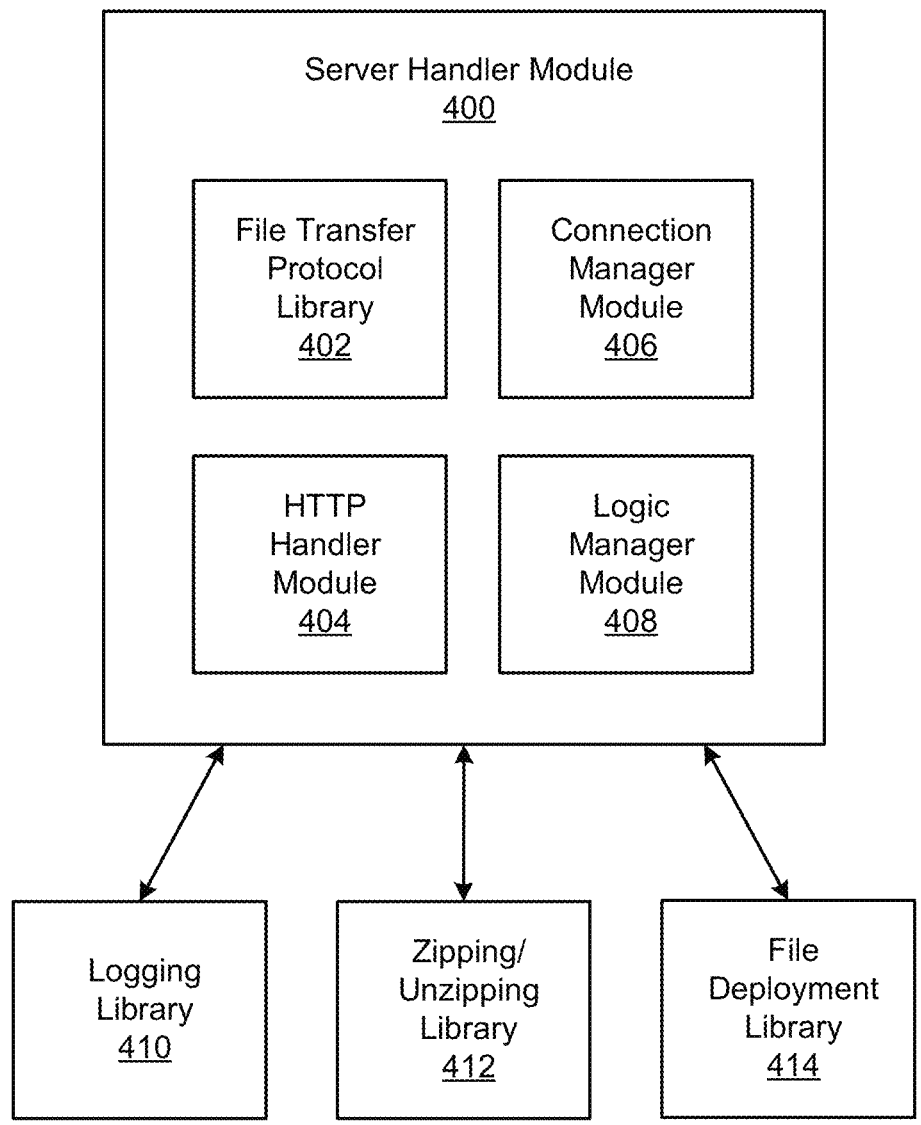
FIG. 4 shows an exemplary block diagram of a server handler module according to embodiments of the present invention.

FIG. 4 shows an exemplary block diagram of a server handler module 400 according to embodiments of the present invention. Server handler module 400 may run on a server computer, such as server computer 110 of FIG. 1, and may enable the server computer to receive and respond to requests to transfer files from a client computer, such as client computer 102. FIG. 4 includes file transfer protocol library 402, a HTTP handler module 404, a connection manager module 406, and a logic manager module 408. Server handler module 400 may be in communication with one or more libraries, such as logging library 410, zipping/unzipping library 412, and file deployment library 414.

File transfer protocol library 402 may manage processing (e.g., chunking and packaging) of a file during the transmission. File transfer protocol library 402 may have similar features to those of file transfer protocol library 200 described in FIG. 2.

HTTP handler module 404 may be the entry point to which to activate logic manager module 408. HTTP handler module 404 may enable examination of incoming and outgoing requests received by server handler module 400 and determine one or more actions to be taken based on the requests. HTTP handler module 404 may communicate to logic manger module 408 to initiate the one or more actions.

Connection manager module 406 may manage communications (e.g., outgoing and incoming network calls, proxies, invalid return codes, etc.). In some embodiments, connection manager module 406 may check which file server is being utilized to store file data.

Logic manager module 408 may manage the work flow of server handler module 400. An exemplary flow enabled by logic manager module 408 may include loading configuration data from a file, calling file transfer protocol library 402 to unpack incoming packets, calling connection manager module 406 to send metadata files, receive a response, and delete the metadata files that have been fully transferred, zipping the file to an appropriate deployment folder, and then calling file deployment library 414.

Server handler module 400 may be in communication with one or more libraries. Logging library 410 may include modules that enable logging of critical events and traces (e.g., errors, timeouts, etc.). Zipping/unzipping library 412 may include modules that enable compressing and decompressing of files. In some embodiments, zipping/unzipping library 412 may provide multi-threaded capabilities. File deployment library 414 may include modules that enable files to be made available for use.

II. Transfer of Files

A file transfer protocol according to embodiments of the invention is described below. The file transfer protocol may enable file chunks with dynamic sizes to be requested and sent during a file transfer. Additionally, the file transfer protocol may enable a client to forgo the need to resend a full file after a loss in connection.

A. Method

Figure 5:
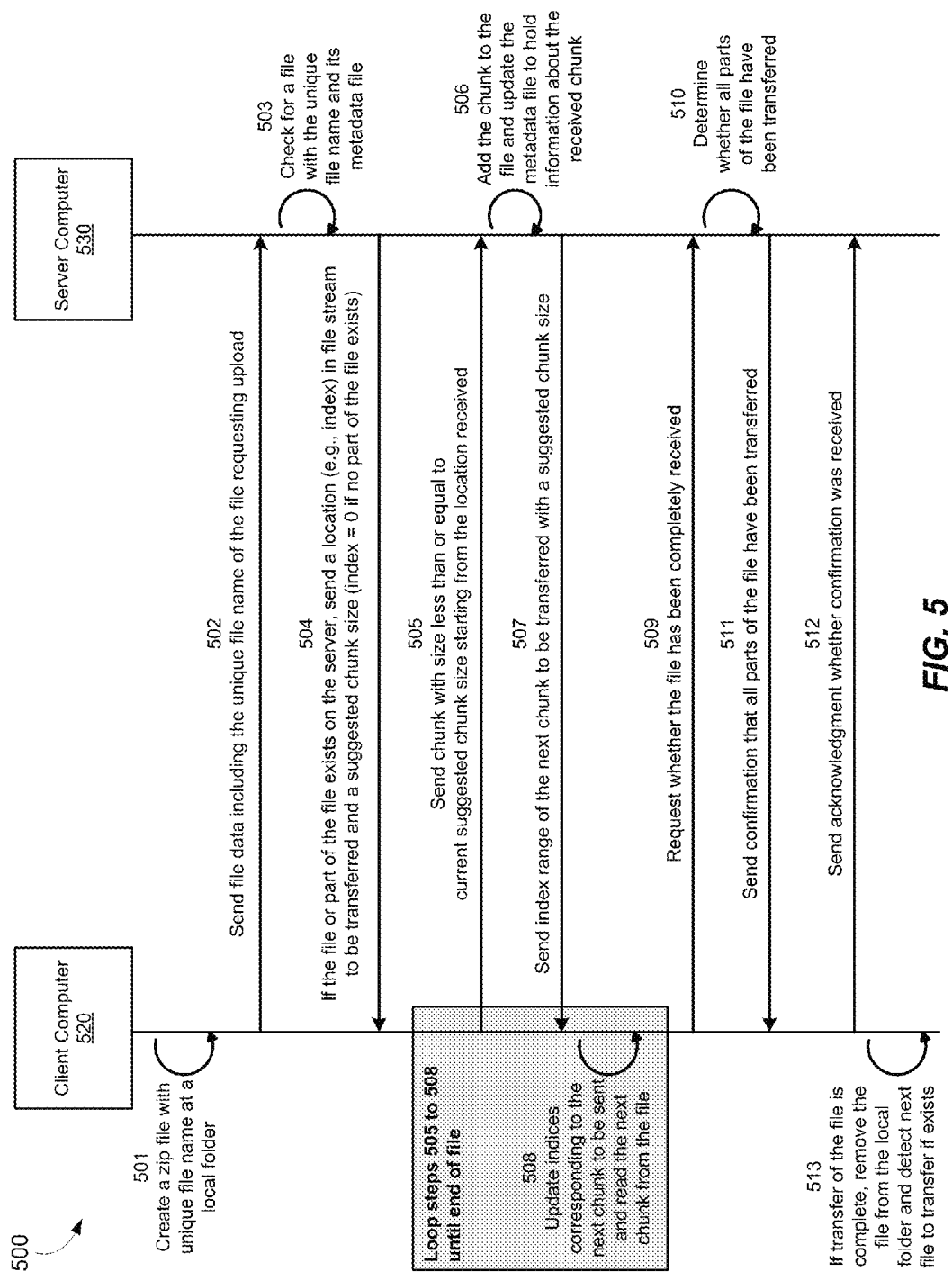
FIG. 5 shows an exemplary flow diagram of a file transfer according to embodiments of the present invention.

FIG. 5 shows an exemplary flow diagram 500 of a file transfer between client computer 520 and server computer 530 according to embodiments of the present invention. In some embodiments, client computer 520 may be client computer 102 and server computer 530 may be server computer 110 of FIG. 1. While flow diagram 500 describes a process for transferring one file, the process may be repeated for multiple files that are requested to be transferred from client computer 520 to server computer 530. In some embodiments, client computer 520 and server computer 530 may support stop and resume options.

Client computer 520 may send requests to server computer 530 by a suitable communications protocol (e.g., HTTP or the like). The file transfer may comprise parts of a file being sent in chunks packed in packets. Each packet may include information surrounding a chunk being transferred, information surrounding the file that the chunk belongs to, and raw chunk data. In some embodiments, a packet may be converted to a file stream at client computer 520, client computer 520 may transmit the file stream to server computer 530, and the file stream may be converted to the packet at server computer 530. A file stream may contain a sequence of bytes corresponding to a file and additional information about the file. For example, the additional information may include an identity of the entity that created the file.

At step 501, client computer 520 may create a compressed file (e.g., zip file) for a file to transfer with a unique filename at a local folder. The filename structure may depend on the configuration of client computer 520 and may include certain file extensions, timestamps, and any other suitable elements to ensure that the filename is unique. In some cases, client computer 520 may store files to be transferred in a local folder for incomplete files.

At step 502, client computer 520 may send file data including the unique file name of the file to be transferred to server computer 530. The file data may be metadata including a filename, a client ID, and a size of the full file. In some embodiments, the metadata may be included in a packet, which may be converted to a file stream. In this initial request send from client computer 520 to server computer 530, the packet may not contain any information associated with a chunk (e.g., values associated with a chunk may be substituted temporarily with zero).

At step 503, server computer 530 may check whether a file with the unique file name is stored at server computer 530. If the file exists, server computer 530 may retrieve a metadata file stored at server computer 530 corresponding to the file. The metadata file may contain information regarding parts of the file that server computer 530 has already received, indicated by indices (e.g., corresponding to bytes) of the file. In some cases, the metadata file may indicate that some parts of the file may not be stored at server computer 530.

At step 504, if the file or part of the file exists on server computer 530, server computer 530 may send a location (e.g., index) in the file stream to be transferred and a suggested chunk size to client computer 520. In some embodiments, the information can be sent by including the information in a packet and returning the packet to client computer 520. If the file or part of the file does not exist on server computer 530, the location sent may correspond to index zero.

At step 505, client computer 520 may send a chunk with a size less than or equal to the suggested chunk size starting from the location received from server computer 530. For example, client computer 520 may choose to send server computer 530 a chunk of size 30 corresponding to indices 1 to 30. This chunk size may be less than a current suggested chunk size of 50 received from server computer 530. The chunk may be sent in a packet including raw chunk data corresponding to a range of indices 1 to 30 of the file and other metadata.

While the suggested chunk size may be dynamically determined by server computer 530 based on conditions (e.g., processor load, system activity, memory usage, network usage, resource utilization, etc.) of server computer 530 when a transfer request is received, client computer 520 may also dynamically determine whether or not to utilize the suggested chunk size when actually sending a chunk to server computer 530. For example, upon receiving the suggested chunk size, client computer 520 may dynamically determine an appropriate chunk size based on conditions (e.g., processor load, system activity, memory usage, network usage, resource utilization, etc.) of client computer 520. In some cases, the appropriate chunk size may have a maximum size corresponding to the suggested chunk size.

The suggested chunk size determined by server computer 530 and appropriate chunk size determined by client computer 520 may be dynamically calculated by any suitable algorithm. Utilizing dynamic chunk sizes can improve stability of the file transfer since client computer 520 and server computer 530 can communicate data with more flexibility and without overloading their systems.

At step 506, server computer 530 may add the chunk received from client computer 520 to the file stored at server computer 530 and update the metadata file associated with the file. Server computer 530 may retrieve the raw chunk data from the received packet and locally store the chunk. Server computer 530 may also update the metadata file to include information about the chunk of the file that was just stored. The information may include a start index and an end index corresponding to the range of file content of the stored chunk. For example, server computer 530 may note in the metadata file that it received and stored file data corresponding to a range with start index 1 to end index 30 of the file from client computer 520. These indices may be read by server computer 530 at a later time to help determine whether the file was completely received.

At step 507, server computer 530 may send an index range corresponding to the next chunk that server computer 530 requests to be received along with a suggested chunk size to client computer 520. The suggested chunk size may be the same or different from a previously suggested chunk size. The index range may include a next start index and a next end index corresponding to the next chunk that the server computer 530 requests to be sent from client computer 520. In some cases, this next start index may be subsequent to the end position of the last chunk position received from client computer 520. For example, server computer 530 may send a request for range 31 to 70 and a suggested chunk size of 40, where the starting index 31 is subsequent to the end index 30 of the last chunk received.

At step 508, client computer 520 may update indices corresponding to the next chunk to be sent and read the next chunk from the file. Client computer 520 may dynamically determine an appropriate chunk size equal or less than the suggested chunk size received in step 507 to be utilized for the next chunk. Client computer 520 may then read the next chunk from the file, where the next chunk has the dynamically determined chunk size. Client computer 520 may update the indices of the next chunk to start index 31 and end index 50 after dynamically determining that a chunk size of 20 is appropriate. Client computer 520 may then read file content in the range of indices 31 to 50 from the file stored at client computer 520.

Steps 505 to 508 may be repeated until the end of the file is reached. In some embodiments, this may occur when client computer 520 recognizes that it has sent requests to transfer all parts of the file to server computer 530.

At step 509, client computer 520 may request whether the file has been completely received by server computer 530. In some embodiments, this may initiate a three-way handshake between client computer 520 and server computer 530.

At step 510, server computer 530 may determine whether all parts of the file have been transferred. Server computer 530 may access and read the metadata file associated with the file and determine whether all index ranges of the file are indicated in the metadata file. If all index ranges of the file are indicated in the metadata file, this may indicate that all parts of the file have been transferred.

Figure 6:
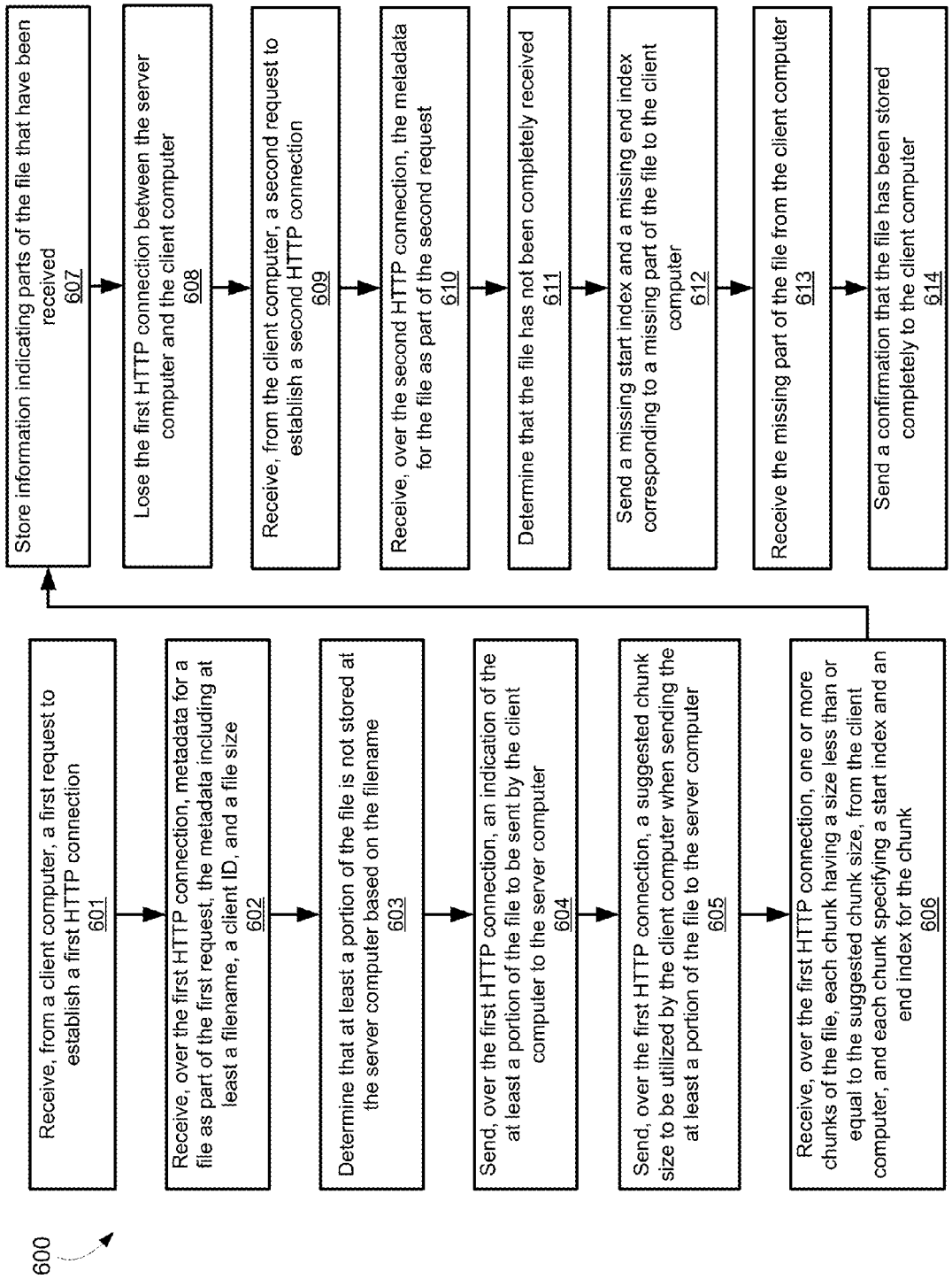
FIG. 6 shows an exemplary flow diagram of a file transfer according to embodiments of the present invention.

At step 511, if server computer 530 determines that all parts of the file have been received, server computer 530 may send a confirmation that all parts of the file have been transferred to client computer 520. In some embodiments, server computer 530 may determine that the file has not been completely received and may not send the confirmation. As described earlier, this may occur if packets get lost due to broken communication or other various reasons. FIG. 6 describes an exemplary embodiment in which a missing chunk may be determined and received by a server computer.

At step 512, client computer 520 may send an acknowledgement regarding whether the confirmation was received. This may complete the three-way handshake and may indicate that the transfer of the file is complete.

At step 513, if the transfer of the file is complete, client computer 520 may remove the file from its local folder and detect a next file to transfer. If the next file to transfer exists, the previously described steps may be repeated for the next file starting from step 502. In some embodiments, the steps may be repeated for all files in the local folder.

B. File Transfer with Loss of Connection

In some embodiments, a loss of connection may occur during a file transfer. Some exemplary reasons for broken communication may include timeouts, a delay in response from a server computer, and lost responses. In another case, there may be a hop limit, in which a limitation exists for the number of times a packet of data may be transferred through a network. If the hop limit is exceeded, the packet may be lost. As described in FIG. 6 below, embodiments of the invention enable locate specific missing parts of a file instead of having to resend the whole file.

FIG. 6 shows an exemplary flow diagram 600 of a file transfer according to embodiments of the present invention. FIG. 6 describes an exemplary file transfer between a client computer and a server computer, where a loss of connection occurs during the file transfer. In some embodiments, the client computer and the server computer referenced in FIG. 6 may have similar properties to those of client computers and server computers included in other figures described herein.

At step 601, the server computer receives a first request to establish a first HTTP connection from the client computer. In some embodiments, the client computer may send requests to the server computer in a one-way communication in which the server computer may not be able to initiate communication with the client computer. Instead, the server computer may respond to requests received from the client computer.

At step 602, the server computer may receive, over the first HTTP connection, metadata for a file as part of the first request. The metadata may be sent in a packet and may include a filename, a client ID, and a file size. The filename may be a unique filename. At this initial request, the packet may not include other information (e.g., chunk metadata, chunk raw data, etc.). In some cases, this other information may be substituted with filler information, such as zero values.

At step 603, the server computer may determine that at least a portion of the file is not stored at the server computer based on the received filename. The server computer may make this determination by checking whether a file with the unique filename is locally stored. In some cases, the whole file may not be stored at the server computer and one or more portions of the file may be missing at the server computer.

The one or more portions of the file may be missing due to broken communication or other reasons.

At step 604, the server computer may send, over the first HTTP connection, an indication of the at least a portion of the file to be sent by the client computer to the server computer. In some embodiments, the indication may include a starting index corresponding to the portion of the file (e.g., chunk) to be sent.

At step 605, the server computer may send, over the first HTTP connection, a suggested chunk size to be utilized by the client computer when sending the at least a portion of the file to the server computer. The suggested chunk size may be dynamically determined by the server computer by any suitable algorithm based on current conditions (e.g., processor load, system activity, memory usage, network usage, resource utilization, etc.) of the server computer.

At step 606, the server computer may receive, over the first HTTP connection, one or more chunks of the file from the client computer. Each chunk may have a size less than or equal to the suggested chunk size from the server computer and each chunk may specify a start index and an end index for the chunk. The client computer may dynamically determine an appropriate size of each chunk to be sent by any suitable algorithm based on current conditions (e.g., processor load, system activity, memory usage, network usage, resource utilization, etc.) of the client computer.

At step 607, the server computer may store information indicating parts of the file that have been received. This information may be stored as metadata associated with the file stored at the server computer. For example, the information may be stored in a metadata file stored at the server computer. The information stored in the metadata file may include a start index and an end index for each chunk received from the client computer. This may enable the server computer to access the information at a later time to help determine specific ranges of the file that have not yet been successfully received from the client computer.

At step 608, the server computer may lose the first HTTP connection between the server computer and the client computer. Some example causes of connection loss include a request time out, in which the client computer did not receive a response from the server computer within a valid time period, and an unstable network, which may cause the server computer to respond to the client computer with an error code. In some cases, the loss of connection may disrupt one or more chunks from being successfully transferred to the server computer.

At step 609, the server computer may receive a second request to establish a second HTTP connection from the client computer. In some embodiments, the server computer may not be able to initiate establishment of the second HTTP connection with the client computer. Instead, the server computer may be able to receive and respond to a request received from the client computer in order to establish the second HTTP connection.

At step 610, the server computer may receive, over the second HTTP connection, the metadata for the file as part of the second request. The metadata may include the filename, the client ID, and the file size, which can be the same metadata that was sent in the first request in step 602.

At step 611, the server computer may determine that the file has not been completely received. The server computer may first utilize the filename to determine whether the file exists at the server computer. If the file exists, the server computer may retrieve the metadata file associated with the file, where the metadata file contains information (e.g., indices) indicating the specific parts of the file that have already been received. If any ranges of the file are not indicated in the metadata file, the server computer may determine that the file has not been completely received.

At step 612, the server computer may send a missing start index and a missing end index corresponding to a missing part of the file to the client computer. For example, the metadata file may indicate that the file has a file size of 1000 and that the server computer has already stored indices 1 through 30 and 71 through 1000 of the file with the filename. This may indicate to the server computer that a portion of the file corresponding to indices 31 to 70 is missing. The server computer may then send a start index of 31 and an end index of 70 corresponding to the missing part of the file to the client computer. This may indicate a request to the client computer to send the missing part (e.g., in a chunk) corresponding to indices 31 to 70 to the server computer.

At step 613, the server computer may receive the missing part of the file from the client computer. For example, the client computer may send a chunk with chunk content (raw data) corresponding to indices 31 to 70 of the file to the server computer. The server computer may store the chunk content and update the metadata file to indicate that the range corresponding to indices 31 to 70 was stored. Subsequently, the metadata file may indicate that the whole file has successfully been stored. The server computer may combine the stored chunks of the file by an appropriate method to generate the complete file.

While the embodiment above describes the missing part of the file being sent in a single chunk, embodiments are not so limited. For example, the client computer may choose to send the missing part of the file in multiple chunks based on dynamically determined chunk sizes. Each chunk may be packed into a package including metadata and transmitted according to embodiments described herein.

At step 614, the server computer may send a confirmation to the client computer indicating that the file is completely stored. This can indicate to the client computer that the transfer of the file has been completed and that there are no parts of the file missing at the server computer.

Embodiments of the invention have several advantages. For example, embodiments enable a server computer to keep track of specific portions of a file that have already been stored. This is beneficial since it allows for a disruption, such as a loss of connection as described in FIG. 6, to not require a file transfer to restart. Typically, such a restart may require a client computer to resend a whole file, including portions of the file that were previously sent. In contrast, since a server computer can identify specific portions of a file that have not yet been stored in embodiments of the invention, only those identified portions may be sent by a client computer after a loss of communication. Further, a client computer and a server computer may dynamically determine appropriate chunk sizes based on real-time conditions at every transmission. These features may improve speed and stability of a file transfer due to efficient use of resources (e.g., prevent overloading).

C. Exemplary Client Side Flow

Figure 7:
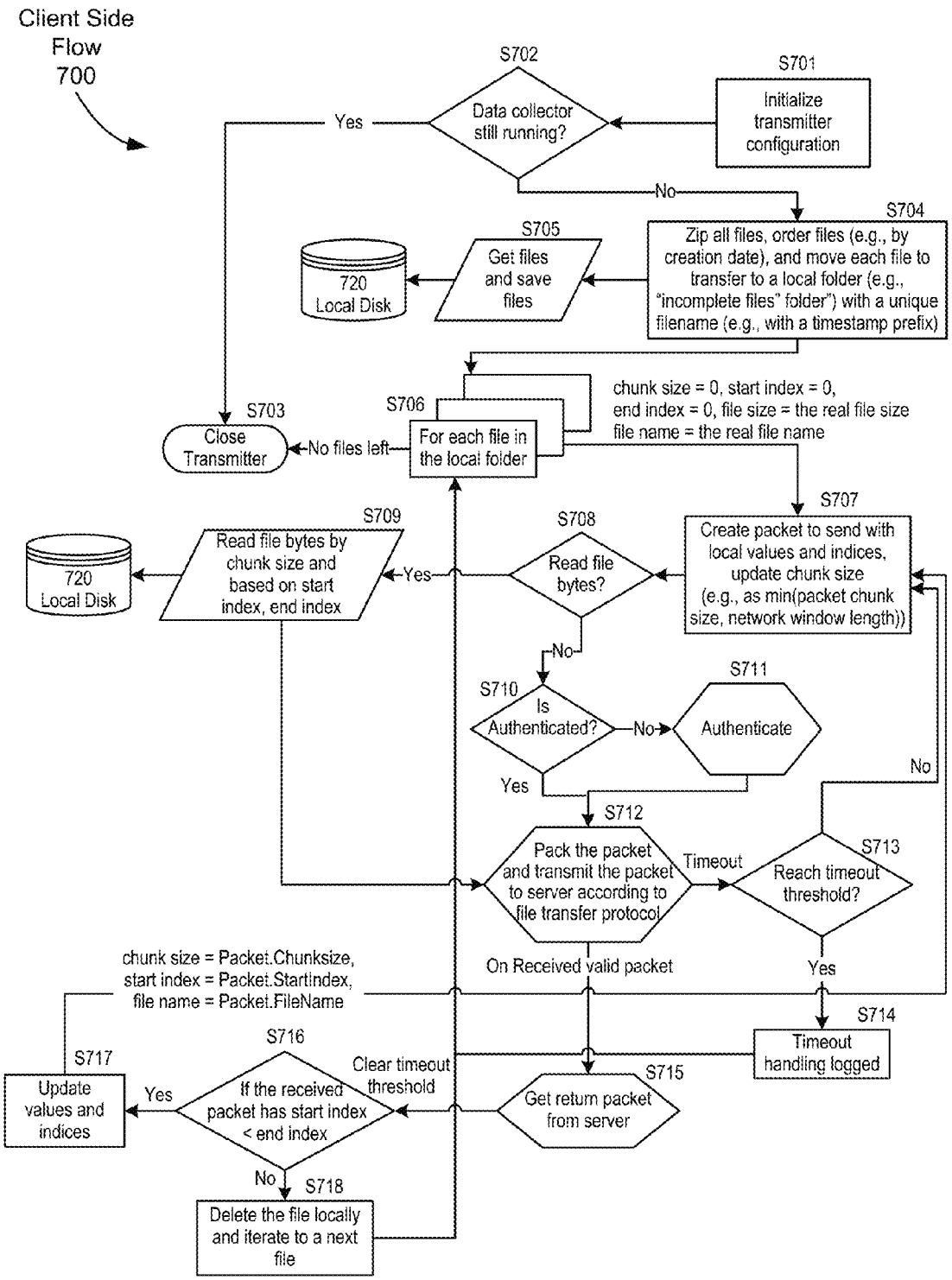
FIG. 7 shows an exemplary client side flow diagram according to embodiments of the present invention.

FIG. 7 shows an exemplary client side flow diagram 700 according to embodiments of the present invention. FIG. 7 may describe embodiments of a file transfer between a client computer and a server computer. In some embodiments, the client computer and the server computer of FIG. 7 may have similar properties to those of client computers and server computers included in other figures described herein. FIG. 7 may be described with reference to components of FIG. 3.

At S701, the client computer may initialize a transmitter configuration. The configuration may be based on configuration information that may be loaded by the client computer. In some embodiments, the configuration information may be similar to that described for transmitter configuration module 306.

At S702, the client computer may determine whether a data collector component is still running. The data collector component may collect files that are to be transferred from the client computer. While the data collector component is running, other processes may not be able to utilize the files as they may be locked. In some embodiments, resource checker module 304 may check that the data collector component is not running before running any conflicting processes that may try to utilize the same resources.

At S703, the transmitter may close if the data collector is still running. In some cases, no file transfer may be started until the data collector stops running.

At S704, a file transfer may be initiated if the data collector is not running. The client computer may compress (e.g., zip) files to be transferred, order the files in a desired order (e.g., by creation date, etc.), and move each file to transfer to a local folder (e.g., "incomplete files" folder, etc.) with a unique filename. The filename may include any suitable elements that can make the filename unique (e.g., a timestamp prefix, etc.).

At S705, the client computer may save the files to local disk 720 on the client computer and retrieve any relevant files from local disk 720 for a transfer.

At S706, a loop may be initiated for steps that can be repeated for each file in the local folder. In an exemplary case, the local folder may be an "incomplete files" folder and the files may be ordered by creation date.

At S707, a packet can be created including current values. In some embodiments, the client computer may utilize properties of file transfer protocol library 302 to manage packaging and chunking of data. If this is an initial transfer request for a file, the packet may include a real file size, a real file name, and zero values for other metadata, such as chunk size, start index, and end index. The zero values may be replaced with actual values further along in the file transfer. If this is not an initial transfer request for a file, the packet may include a real file size, a real file name, and actual values for metadata, such as a chunk size, a start index, and an end index. The client computer may update any metadata values based on information received from the server computer and other dynamically determined values (e.g., chunk size).

For example, the client computer may update chunk size information to reflect an appropriate chunk size corresponding to a chunk to be sent. In some embodiments, the chunk size deemed appropriate by the client computer may be the minimum of either a suggested chunk size from the server computer or the network window length. Thus, the client computer can monitor the current network conditions to determine an appropriate chunk size. In other embodiments, the chunk size determined by the client computer may be calculated based on any other suitable information and methods.

At S708, the client computer may determine whether to read file bytes to retrieve chunk content (e.g., raw data) to send to the server computer. If the client computer determines to read file data, the client computer may access local disk 720. At S709, the client computer may then read file bytes for a chunk of a size deemed appropriate by the client computer (at S707) starting at the start index received from the server computer.

In some cases, the client computer may determine to not read file data at this point. For example, at S710 and 5711, the client computer may first authenticate with the server computer before continuing a file transfer. If authentication fails, no parts of the files may be transferred. Authentication may be conducted using any suitable process.

At S712, the client computer may pack the packet with any relevant information and transmit the packet to the server computer according to embodiments of the invention. The packet may include chunk raw data corresponding to the file bytes read by the client computer at S709 and other metadata.

In some cases, a timeout may occur at the client computer. In some embodiments, this may trigger connection manager module 308 to notify logic manager module 310 that the timeout has occurred. If a timeout threshold, which may be a predetermined time period, has not been reached at S713, the client computer may resend the packet transmitted at S712 to the server computer. In some embodiments, the client computer may resend the packet in periodic intervals with dynamically determined chunk sizes until successful transmission or the timeout threshold is reached. In some cases, during the period in which the packet cannot be successfully sent, the client computer may choose to utilize a smaller chunk size at each successive transmission attempt.

If the timeout threshold has been reached at S713, the client computer may log information regarding timeout handling at S714 and then repeat steps starting at S706. For example, the client computer may create another packet to send in a new file transfer request as in S707 including metadata (e.g., filename, file size, client ID, etc.). Despite a break in connection, as long as the server computer receives such metadata corresponding to the file from the client computer, the server computer can determine specific missing portions of the file and solely request those portions based on information in the corresponding metadata file stored at the server computer.

At S715, the client computer may receive a return packet from the server computer including metadata updated by the server computer. The metadata may include a missing start index, a missing end index, and a suggested chunk size.

At S716, the client computer may check the indices included in the received packet. In an exemplary case, if the received packet includes a start index that is less than the end index, this may indicate to the client computer that the file transfer for the file has not yet completed. The client computer may update any values (e.g., chunk size) and indices to include in the packet to be sent back to the server computer at S717. In some cases, the client computer may update the chunk size dynamically determined based on current conditions of the client computer. The chunk size may be less than or equal to the suggested chunk size received from the server computer. After the values have been updated by the client computer, a new packet can be created including these values and then transmitted to the server computer in a similar process described above starting at S707.

At S718, if the file has been completely transmitted, the client computer may delete the file stored locally and iterate to a next file to be transferred. In an exemplary case, if the received packet does not have a start index less than the end index, this may indicate to the client computer that the transfer for the file has completed. The next file may be transferred in a similar process to that described above. If all files in the local folder have been transferred, the transmitter may be closed as in S703.

D. Exemplary Server Side Flow

Figure 8:
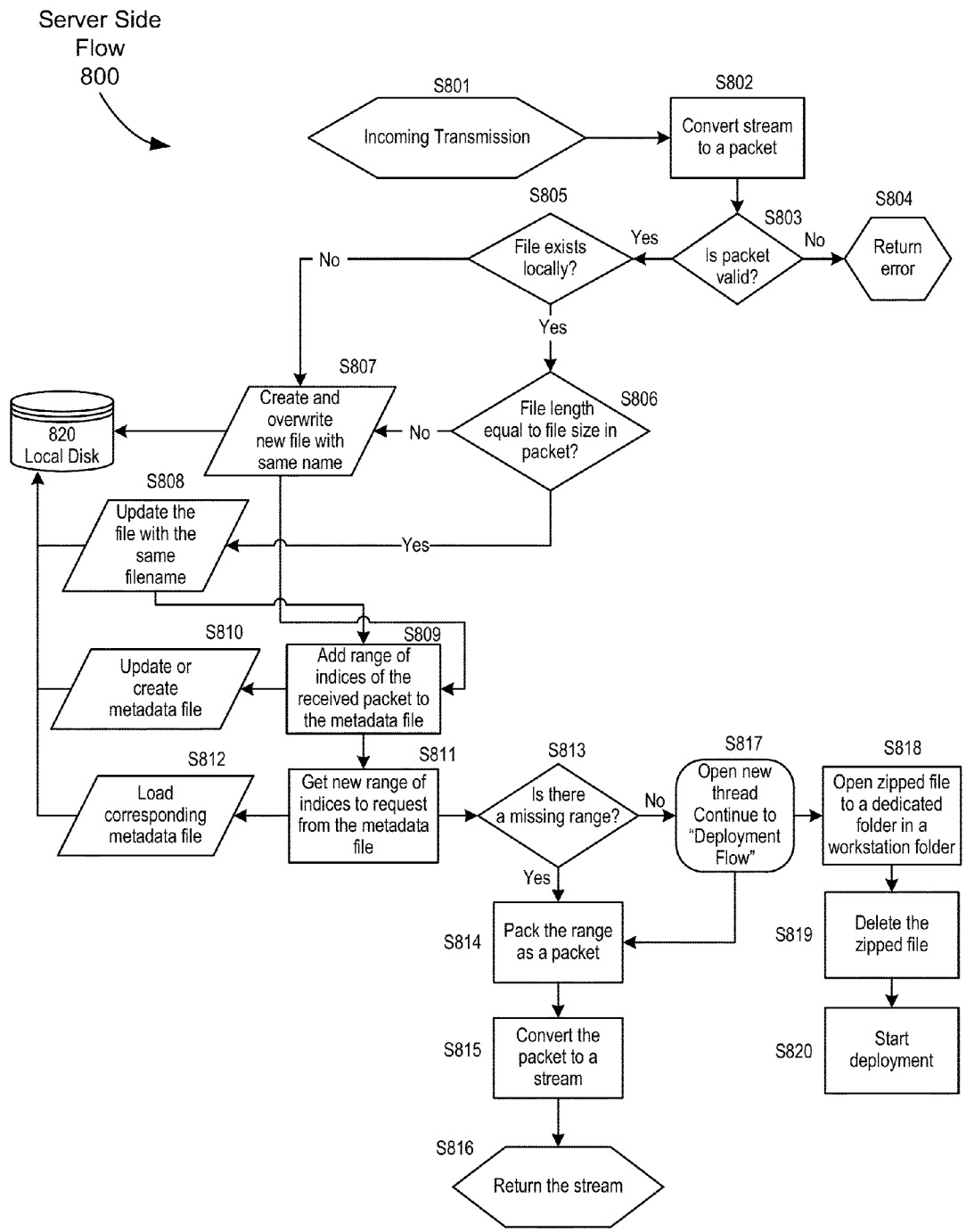
FIG. 8 shows an exemplary server side flow diagram according to embodiments of the present invention.

FIG. 8 shows an exemplary server side flow diagram 800 according to embodiments of the present invention. FIG. 8 may describe embodiments of a file transfer between a client computer and a server computer. In some embodiments, the client computer and the server computer of FIG. 8 may have similar properties to those of client computers and server computers included in other figures described herein. FIG. 8 may be described with reference to components of FIG. 4.

At S801, the server computer may receive an incoming transmission for a packet from the client computer. The packet may be received as a file stream converted by the client computer and may include metadata. At S802, the server computer may convert the file stream to the packet. At S803, the server computer may determine whether the packet is valid by any suitable method. In some embodiments, the server computer may utilize a checksum calculation that can verify that data received in the packet is valid and complete. If the packet is not valid, the server computer may return an error at S804. Since this may prevent the transfer of the file to complete, this may cause the client computer to resend a request including metadata (e.g., filename, file size, client ID, etc.) to the server computer.

At S805, if the packet is valid, the server computer may determine whether the file being requested for transfer exists locally at the server computer. The server computer may check whether at least a part of the file exists with the same name as the filename received in the metadata from the client computer. If the file with the filename does not locally exist, the server computer may create a new file with the filename at S807 and store the new file at local disk 820. In some embodiments, local disk 820 may be located at a file server of the server computer.

If at least part of the file with the unique filename does exist locally, the server computer may determine whether a file length associated with the file stored at the server computer is equal to the file size indicated in the metadata of the received packet at S806. If the file length and file size do not match, this may indicate to the server computer that the file may be corrupted. Hence, this may cause the server computer to overwrite the file at S807.

Overwriting the file may comprise deleting the local file and corresponding metadata file stored at the server computer and treating the received packet as a first packet received for the file. A new file may be created at the server computer with the filename. However, if the file length and the file size do match, the server computer may retrieve the file stored at local disk 820 with the same filename and update its contents with a chunk included in the received packet at S808.

At S809, the server computer may add a range of indices from the received packet to a metadata file corresponding to the file. If the metadata file already exists, the server computer may update the metadata file with the range of indices in S810. If the file is being overwritten and a metadata file was deleted at S807, a new metadata file may be created at S810 and the server computer may add the range of indices to the newly created metadata file. The metadata file may be stored on local disk 820. The range of indices may correspond to a chunk that was just stored at the server computer and may be indicated by a start index and an end index. This information may indicate to the server computer in the future that the file data corresponding to the range of indices has successfully been stored.

At S811, the server computer may determine a new range of indices of the file to request from the client computer. The server computer may load the corresponding metadata file at S812 to examine which ranges of the file, indicated by start and end indices, have already been received. At S813, the server computer may determine whether there is a missing range from the file based on information in the corresponding metadata file. Any range that is not indicated in the metadata file may correspond to a missing range.

If it is determined that there is a missing range at S813, the server computer may pack the missing range as a packet at S814. For example, the server computer may include in the packet a missing start index and a missing end index corresponding to the missing range. The missing start index and the missing end index may communicate to the client computer the range of file bytes of the file that have not yet been stored at the server computer.

At S815 and S816, the server computer may convert the packet to a file stream and return the file stream to the client computer. The packet may be sent over any suitable communications protocol (e.g., HTTP, etc.).

If the metadata file indicates there is no missing range at S813, the server computer may open a new thread at S817. In some embodiments, the server computer may continue to carry out a deployment flow, which may include opening compressed files (e.g., unzipping) to a dedicated folder in a workstation folder at S818, deleting the compressed (e.g., zipped) files at S819, and starting deployment at S820. This deployment process may make accessible file content and other information stored by the server computer. For example, stored file content and information, as well as analysis based on the file content and information, may be displayed in an interface.

III. Computer System

Figure 9:
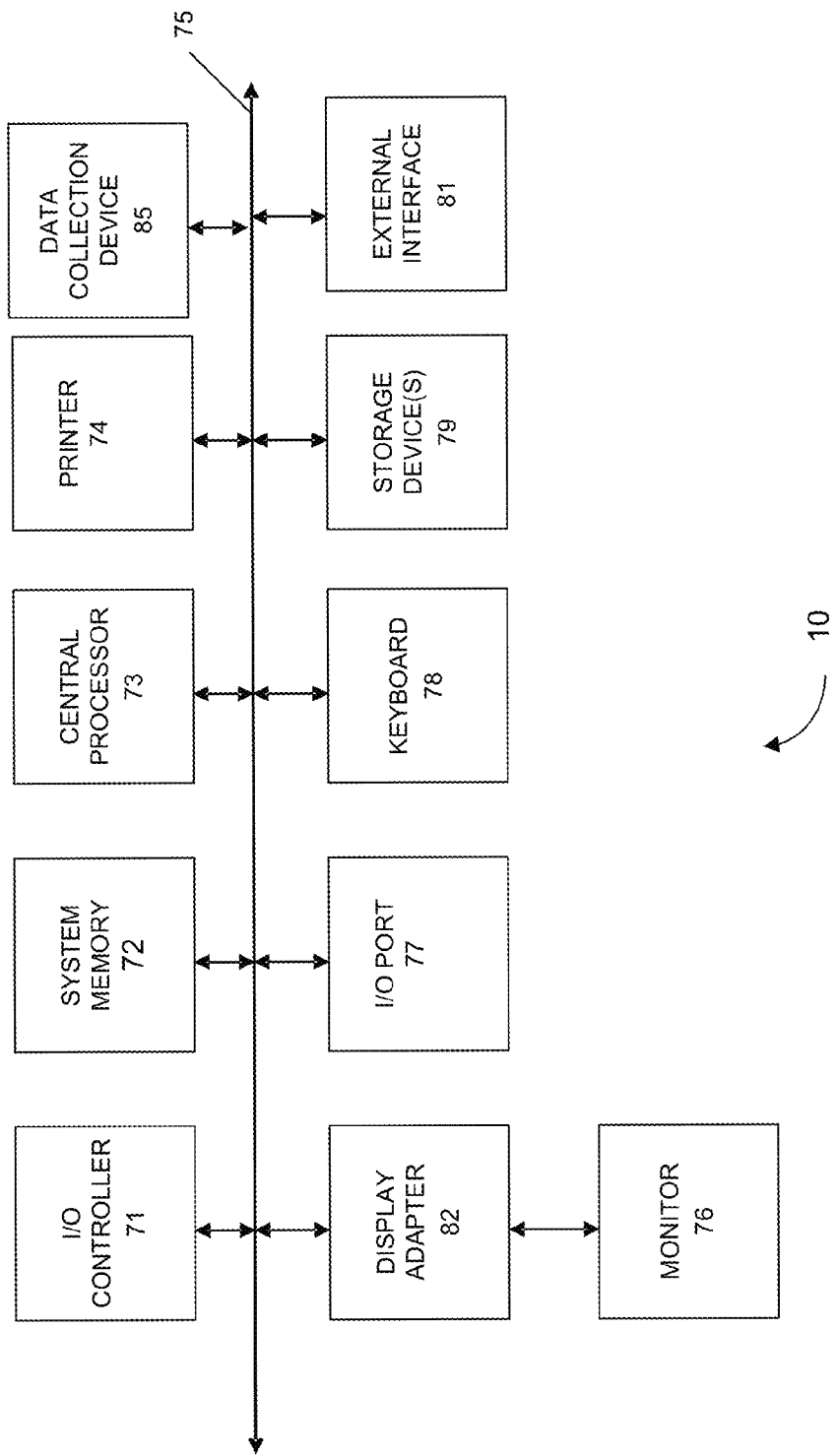
FIG. 9 shows a block diagram of a computer apparatus.

Any of the computer systems mentioned herein may utilize any suitable number of subsystems. Examples of such subsystems are shown in FIG. 9 in computer apparatus 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer apparatus 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed:

1. A method comprising performing, by a server computer:
   receiving, from a client computer, a first request to establish a first HTTP connection;
   receiving, over the first HTTP connection, metadata for a file as part of the first request, the metadata including at least a filename, a client ID, and a file size;
   determining that at least a portion of the file is not stored at the server computer based on the filename;
   sending, to the client computer over the first HTTP connection, an indication of the at least a portion of the file to be sent by the client computer to the server computer;
   sending, over the first HTTP connection, a suggested chunk size to be utilized by the client computer when sending the at least a portion of the file to the server computer;
   receiving, over the first HTTP connection, one or more chunks of the file, each chunk having a size less than or equal to the suggested chunk size, from the client computer, and each chunk specifying a start index and an end index for the chunk;
   storing information indicating parts of the file that have been received;
   losing the first HTTP connection between the server computer and the client computer;
   receiving, from the client computer, a second request to establish a second HTTP connection;
   receiving, over the second HTTP connection, the metadata for the file as part of the second request;
   determining that the file has not been completely received;
   sending a missing start index and a missing end index corresponding to a missing part of the file to the client computer;
   receiving the missing part of the file from the client computer; and
   sending a confirmation that the file has been stored completely to the client computer.

2. The method of claim 1, wherein determining that the file has not been completely received comprises:
   determining that the file exists at the server computer based on the filename in the metadata received with the second request;
   accessing the information indicating parts of the file that have been received; and determining that at least a portion of the file has not been received based on the accessed information.

3. The method of claim 2, wherein the filename is a unique filename.

4. The method of claim 2, wherein the information indicating parts of the file that have been received includes the start index and the end index for each of the one or more chunks received by the server computer.

5. The method of claim 1, further comprising performing, by the server computer:
storing the start index and the end index corresponding to the missing part of the file received from the client computer.

6. The method of claim 1, wherein the suggested chunk size is dynamically determined by the server computer.

7. The method of claim 1, wherein the size less than or equal to the suggested chunk size is dynamically determined by the client computer.

8. The method of claim 1, wherein the missing part of the file is received from the client computer in one or more chunks.

9. The method of claim 1, further comprising performing, by the server computer:
combining the one or more chunks of the file and the missing part of the file received from the client computer.

10. The method of claim 1, further comprising performing, by the server computer:
determining that a file length associated with the file stored at the server computer is not equal to the file size included in the metadata;
deleting the file stored at the server computer and the information indicating parts of the file that have been received; and
creating a new file with the filename included in the metadata.

11. A server computer comprising:
a processor;
a computer-readable medium coupled to the processor, the computer-readable medium comprising instructions, that when executed by the processor, perform:
receiving, from a client computer, a first request to establish a first HTTP connection;
receiving, over the first HTTP connection, metadata for a file as part of the first request, the metadata including at least a filename, a client ID, and a file size;
determining that at least a portion of the file is not stored at the server computer based on the filename;
sending, to the client computer over the first HTTP connection, an indication of the at least a portion of the file to be sent by the client computer to the server computer;
sending, over the first HTTP connection, a suggested chunk size to be utilized by the client computer when sending the at least a portion of the file to the server computer;
receiving, over the first HTTP connection, one or more chunks of the file, each chunk with a size less than or equal to the suggested chunk size, from the client computer, wherein each chunk specifies a start index and an end index for the chunk;
storing information indicating parts of the file that have been received;
losing the first HTTP connection between the server computer and the client computer;
receiving, from the client computer, a second request to establish a second HTTP connection;
receiving, over the second HTTP connection, the metadata for the file as part of the second request;
determining that the file has not been completely received;
sending a missing start index and a missing end index corresponding to a missing part of the file to the client computer;
receiving the missing part of the file from the client computer; and
sending a confirmation that the file has been stored completely to the client computer.

12. The server computer of claim 11, wherein determining that the file has not been completely received comprises:
determining that the file exists at the server computer based on the filename in the metadata received with the second request;
accessing the information indicating parts of the file that have been received; and
determining that at least a portion of the file has not been received based on the accessed information.

13. The server computer of claim 12, wherein the filename is a unique filename.

14. The server computer of claim 12, wherein the information indicating parts of the file that have been received includes the start index and the end index for each of the one or more chunks received by the server computer.

15. The server computer of claim 11, wherein the instructions, that when executed by the processor, further perform:
storing the start index and the end index corresponding to the missing part of the file received from the client computer.

16. The server computer of claim 11, wherein the suggested chunk size is dynamically determined by the server computer.

17. The server computer of claim 11, wherein the size less than or equal to the suggested chunk size is dynamically determined by the client computer.

18. The server computer of claim 11, wherein the missing part of the file is received from the client computer in one or more chunks.

19. The server computer of claim 11, wherein the instructions, that when executed by the processor, further perform:
combining the one or more chunks of the file and the missing part of the file received from the client computer.

20. The server computer of claim 11, wherein the instructions, that when executed by the processor, further perform:
determining that a file length associated with the file stored at the server computer is not equal to the file size included in the metadata;
deleting the file stored at the server computer and the information indicating parts of the file that have been received; and
creating a new file with the filename included in the metadata.

21. The method of claim 1, further comprising:
determining, based on the information stored by the server computer indicating parts of the file that have been received, the missing start index and the missing end index corresponding to the missing part of the file,
wherein determining that the file has not been completely received is based on the determination of the missing start index and the missing end index.

22. The method of claim 7, wherein the size less than or equal to the suggested chunk size is dynamically determined by the client computer based on current network conditions.

23. The server computer of claim 11, wherein the instructions, that when executed by the processor, further perform:
   determining, based on the information stored by the server computer indicating parts of the file that have been received, the missing start index and the missing end index corresponding to the missing part of the file,
   wherein determining that the file has not been completely received is based on the determination of the missing start index and the missing end index.

24. The server computer of claim 17, wherein the size less than or equal to the suggested chunk size is dynamically determined by the client computer based on current network conditions.

* * * * *